United States Patent [19]
Huret

[11] 4,222,286
[45] Sep. 16, 1980

[54] HAND LEVER CONTROL FOR BICYCLE DERAILLEUR GEARS

[76] Inventor: Roger H. M. Huret, 60, Avenue Félix Faure, Nanterre (Hauts de Seine), France

[21] Appl. No.: 928,197

[22] Filed: Jul. 26, 1978

[30] Foreign Application Priority Data

Aug. 8, 1977 [FR] France ............................... 77 24378

[51] Int. Cl.$^2$ ............................................. F16C 1/10
[52] U.S. Cl. ................................................ 74/501 R
[58] Field of Search ...................... 74/475, 501 R, 502

[56] References Cited

U.S. PATENT DOCUMENTS

| | | | |
|---|---|---|---|
| 3,418,867 | 12/1968 | Maeda | 74/501 R |
| 3,426,614 | 2/1969 | Brilando et al. | 74/501 R |
| 4,007,645 | 2/1977 | Dove et al. | 74/501 R |
| 4,055,093 | 10/1977 | Ross | 74/475 |

*Primary Examiner*—Patrick D. Lawson
*Attorney, Agent, or Firm*—Spensley, Horn, Jubas & Lubitz

[57] ABSTRACT

Hand lever control for bicycle derailleur gears comprising a lever pivoting on a shaft and against which is applied, through the intermediary of a spring, a co-axial washer cooperating with said lever through ribs and grooves, the hand lever being characterized in that the washer, for its angular positioning, cooperates with play with a fixed stop.

6 Claims, 2 Drawing Figures

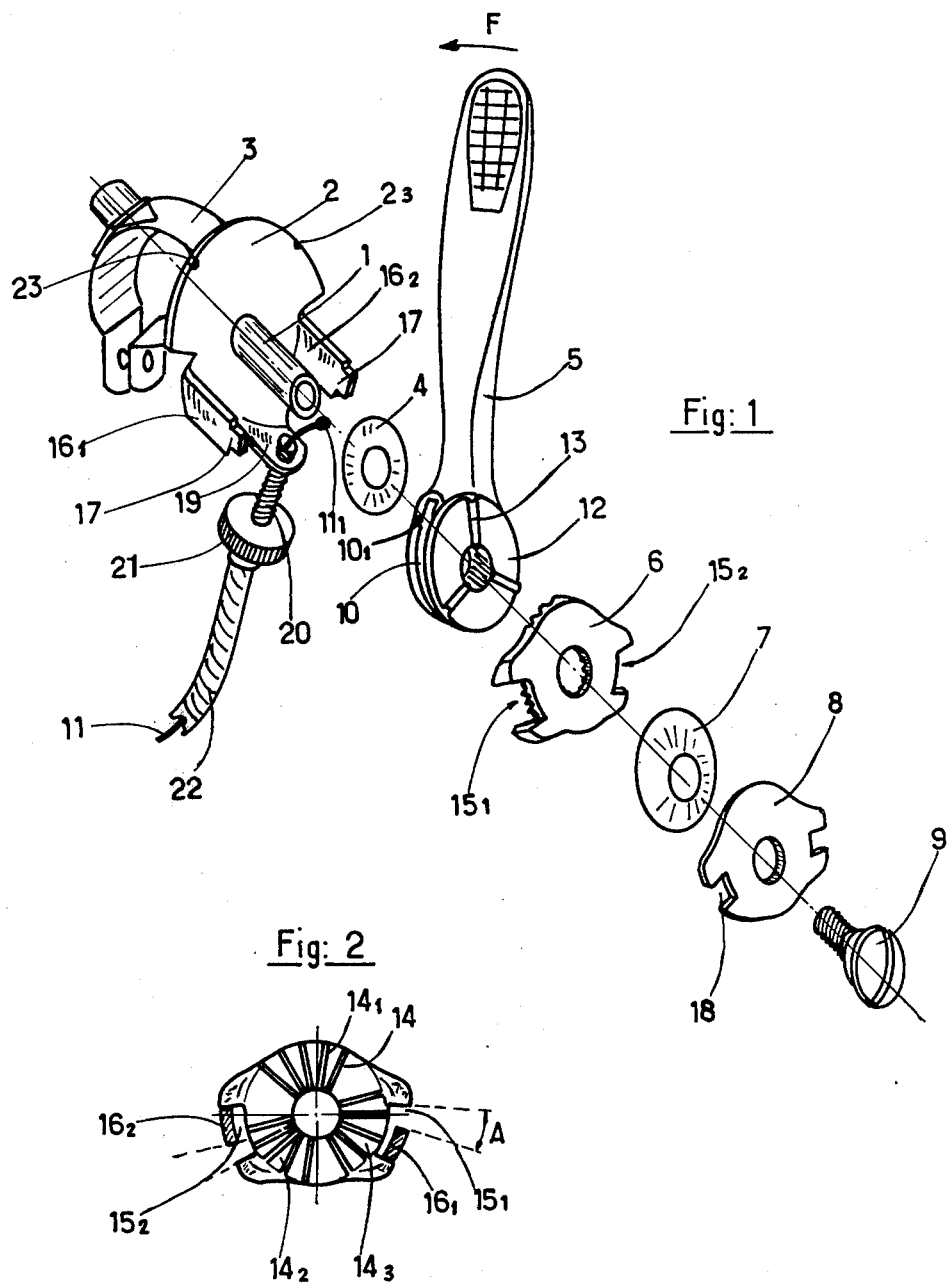

HAND LEVER CONTROL FOR BICYCLE DERAILLEUR GEARS

This invention relates to a hand lever control for bicycle derailleur gears.

Attempts have already been made to provide a control hand lever with angular pre-positionings corresponding to different speeds of the derailleur gear device. The objects of these attempts are to increase the rapidity of changing speeds and to facilitate manipulation by the operator.

However, up to the present day, this result has never been achieved because operating the hand lever in order to go from one speed to a lower speed (making use of a larger idler pinion), exerts a pull on the cable joined to the derailleur gear hand lever. As, the cable is covered in a whole or in part by a sheath curved in the direction of greater or lesser bends, the pull which is exerted on the cable has the effect of shortening the sheath. This shortening of the sheath corresponds to a virtual lengthening of the cable itself, since this virtual lengthening of the cable is a function of the pull exerted on the cable, and this pull itself depends as much on the speed of manipulation of the hand lever as on the difference in the number of teeth on the pinions being used, any pre-positioning of the hand lever is impossible.

The particular object of the present invention is to overcome these disadvantages. A character of this invention is a hand lever in which the washer, for its angular positioning, cooperates with play with a fixed stop.

Another characteristic of this invention is that the stop is formed on the support of the shaft on which the lever pivots.

A third characteristic of the invention is that the support of the pivoting lever comprises a flange provided with a threade1 opening which receives a hallow screw as a means for guiding the cable and for regulating the tension of the sheath of this cable.

The invention is shown, by way of non-limiting example, on the annexed drawings, in which:

FIG. 1 is a perspective view of a hand lever control in accordance with the invention;

FIG. 2 is an elevation of the pre-positioning washer of the hard lever control cooperating with play with fixed stops.

An object of the present invention is consequently to provide, for a bicycle derailleur gear, that is, a rear wheel derailleur gear or a crank derailleur gear, a hand lever control which not only provides pre-positionings corresponding to different speeds of the derailleur gear, but also automatically takes into account, from the initial movement of the hand lever control, either disorders which bring about virtual lengthening of the cable produced in the course of these movements play existing in the derailleur gear itself and in the chain.

On the annexed drawings, the hand lever shown comprises a shaft 1 integral with a support plate 2 with a means for putting the hand lever into place on the frame of a bicycle, this means being a clip 3 in the embodiment shown.

Positioned successively against one another on this shaft 1 are a support washer 4, the operating hand lever 5, the pre-positioning washer 6, a spring washer 7, a clothing cover 8 and a connecting screw 9.

The handle 5 has, as is shown, a peripheral groove 10 within which can be accommodated the cable 11 for operating the derailleur gear, the end $11_1$ of which cable 11 is provided with a knob for locking the cable 11 at $10_1$ on the lever.

One one of the faces of this lever is formed or fixed a disk 12 provided with radial ribs 13 corresponding in form, dimension and position to grooves 14 in the washer 6.

In the embodiment shown in the annexed drawings, this washer 6 has three sets $14_1$, $14_2$, $14_3$ of radial grooves while the disk 12 has three ribs 13 at regular intervals in order to distribute the forces and ensure the best positioning of these parts with respect to one another.

The periphery of the washer 6 has two recesses $16_1$ and $16_2$ formed by opening the plate 2 back.

Moreover, the ends of these stops $16_1$ and $16_2$ are provided with tongues 17 corresponding in dimension and position to notches 18 formed at the periphery of the cover 8.

Thus, after having positioned the parts 4, 5, 6 and 7 against one another on the shaft 1, the cover 8 is put into place on the tongues 17 which position the cover 8 axially and radially, the position of this cover being such that axial displacement of the washer 6 against the washer 7 is permitted when the lever 5 is moved to cause the ribs 13 to pass from one groove 14 to the next.

This cover 8 is locked in position by the screw 9. As will be seen from FIG. 1, the support 2 is also provided with a flange 19 in to which is screwed a hollow screw 20 provided with a milled head 21, this screw 20 being traversed by the traction cable 11 and supporting the end of the sheath 22 of the cable. By movement of this screw, the sheath is compressed to a greater or lesser extent in order to regulate the tension of the cable.

This hand lever operates as follows.

When the movement of the lever 5 in the direction of the arrow F in order to produce a change in speed is commenced, a pull is exerted on the cable. However, at the start of this movement of the lever, a swivelling movement of the washer 6 is also brought about over an angle A corresponding to the play existing between the recesses $15_1$, $15_2$ and the stops $16_1$ and $16_2$, this movement occurring without the ribs 13 leaving their grooves 14.

When the lever 5 and the washer 6 have pivoted together through angle A, the stops $16_1$ $16_2$ are again resting on the sides of the recesses $15_1$, $15_2$ of the washer 6 and this washer 6 is immobilised while the pivotal movement of the lever 5 is continued causing the ribs 13 to leave their grooves 14 in the washer 6, the latter being pushed back against the spring 7.

The swinging of the lever 5 is then continued until the ribs 13 fall into the next grooves of the washer 6. This is felt immediately by the operator because of the increase in the resistance to movement of the lever.

The operator then releases the lever 5, the effect of which is to cause the lever as well as the washer 6 to pivot in the direction opposite to the arrow F through an angle corresponding to the angle A. This is due to the reactive force exerted by the cable and the derailleur gear mechanism which, at this stage, has caused a change in speed.

Thus, with the operation of this hand lever control, the movement of the lever 5 necessary for a change of speed is, increased by angle A in such a manner as to take into account automatically possible compressions of the shaft 22 and play in both the derailleur mechanism and in the chain. This angle A disappears at the end of the change of speed the pivotal motion of the lever and washer in the reverse direction as soon as the operator releases the lever.

With this hand lever, it is therefore possible to preposition the different speeds, the selection of which may be furthermore facilitated by providing lever 5 and on the plate 2, guide or reference marks 23 corresponding to the stop positions of the lever 5.

It will be understood that the invention is not restricted to the embodiment above described and shown, other forms and other embodiments could be provided without thereby departing from the scope of the invention.

I claim:

1. Hand lever control for bicycle derailleur gears comprising a lever pivoting on a shaft and against which is applied, through the intermediary of a spring, a co-axial washer cooperating with said lever through ribs and grooves, the hand lever being characterised in that the washer, for its angular positioning, cooperates with play with a fixed stop.

2. Hand lever according to claim 1, characterised in that the stop is formed on the support of the shaft on which the lever can pivot.

3. Hand lever according to claim 1, characterised in that the support of the pivoting lever comprises a flange provided with a threaded opening receiving a hollow screw for guiding the cable and for regulating the tension of the sheath of this cable.

4. Hand lever according to claim 1, characterised in that the lever and the washer have several sets of grooves and ribs uniformly spaced apart.

5. Hand lever according to claim 2, characterised in that the stop is formed by bending the support.

6. Hand lever according to claim 1, characterised in that it has at least two stops integral with the support of the shaft for the pivotal movement and located with play in recesses in the cio-axial washer.

* * * * *